Dec. 10, 1963  P. C. BRESTEL  3,113,752
PARACHUTE CONTROL APPARATUS
Filed Jan. 23, 1962  5 Sheets-Sheet 1

INVENTOR.
Pliny C. Brestel.
BY
Wood, Herron & Evans.
ATTORNEYS.

Dec. 10, 1963 P. C. BRESTEL 3,113,752
PARACHUTE CONTROL APPARATUS
Filed Jan. 23, 1962 5 Sheets-Sheet 2

INVENTOR.
Pliny C. Brestel.
BY
Wood, Herron & Evans
ATTORNEYS.

Dec. 10, 1963 P. C. BRESTEL 3,113,752
PARACHUTE CONTROL APPARATUS
Filed Jan. 23, 1962 5 Sheets-Sheet 4
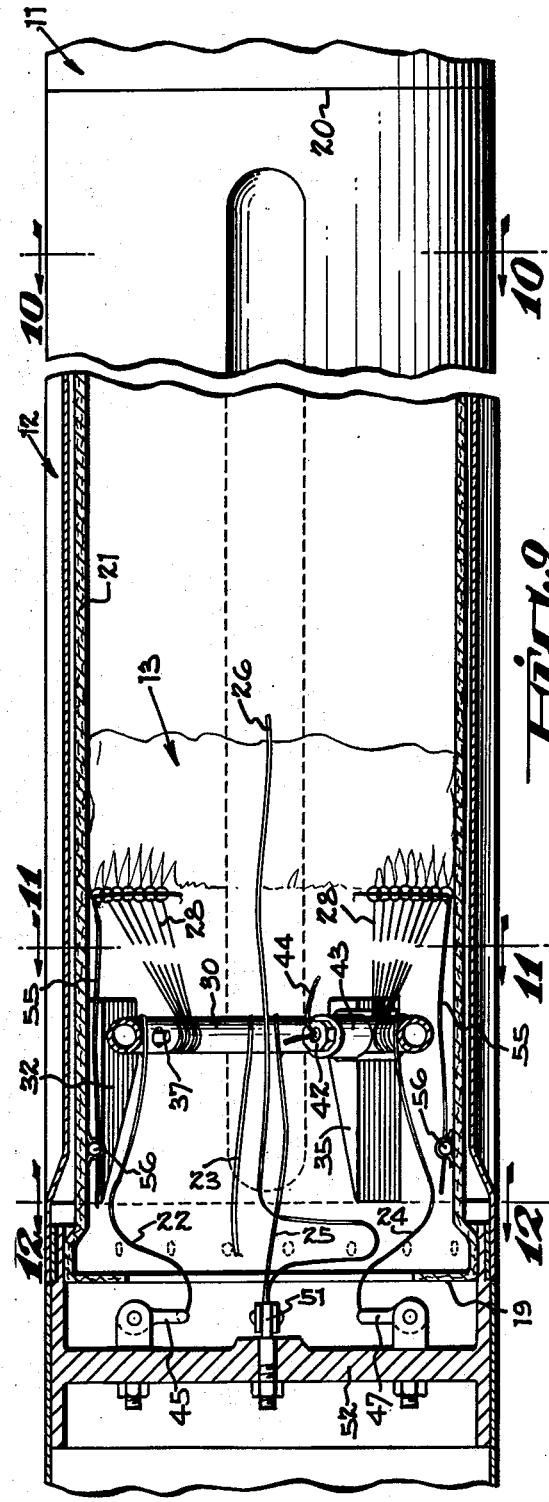
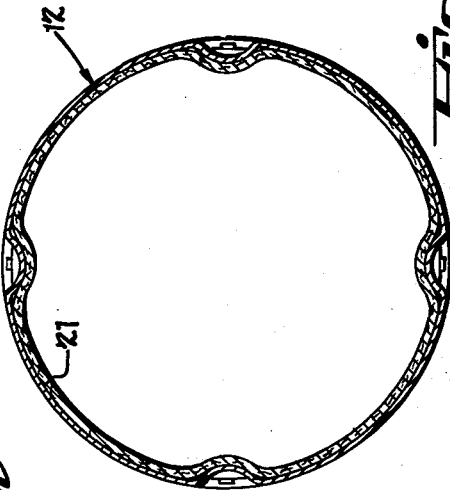
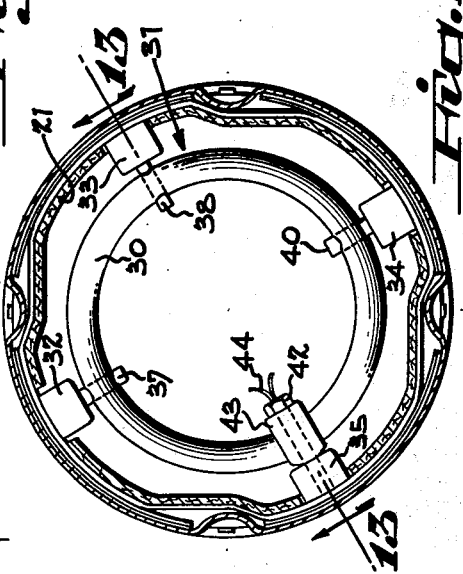
INVENTOR.
Pliny C. Brestel.
BY
Wood, Herron & Evans.
ATTORNEYS.

Dec. 10, 1963 P. C. BRESTEL 3,113,752
PARACHUTE CONTROL APPARATUS
Filed Jan. 23, 1962 5 Sheets-Sheet 5
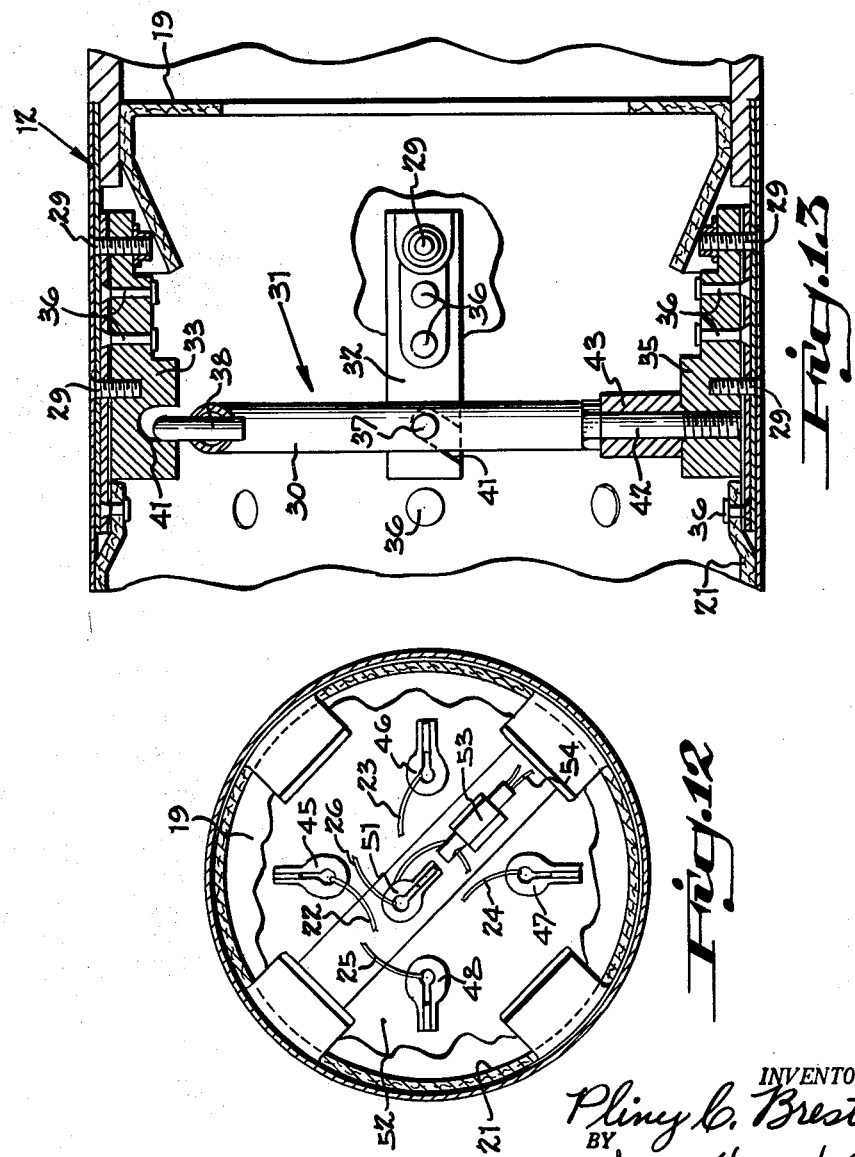
INVENTOR.
Pliny C. Brestel.
BY
Wood, Herron & Evans.
ATTORNEYS.

United States Patent Office 3,113,752
Patented Dec. 10, 1963

3,113,752
PARACHUTE CONTROL APPARATUS
Pliny C. Brestel, Middletown, Ohio, assignor to Aeronca Manufacturing Corporation, Middletown, Ohio, a corporation of Ohio
Filed Jan. 23, 1962, Ser. No. 168,106
6 Claims. (Cl. 244—147)

This invention relates to parachutes and is particularly directed to a parachute apparatus including means for reefing, or partially collapsing, a parachute after it has been initially opened and then subsequently reopening the parachute prior to the time that the parachute and its load reach the ground.

The parachute control system of the present invention is primarily intended for use in the recovery of target and research missiles, and the like. For example, at the present time missiles are utilized to provide high altitude targets for radar and infrared guided devices. By way of example, a missile may be fired 120,000 feet into the air, and may function as a target as it drops from 100,000 feet to 80,000 feet. A typical missile is a two-part missile including a forebody section and an afterbody section. Near the apex of the missile's trajectory, the afterbody and forebody sections are separated and a parachute is deployed. The parachute functions to support the missile as it falls slowly through the desired target area which in the present example may have an upper altitude limit of 100,000 feet and a lower altitude limit of 80,000 feet. After it has once dropped below the lower limit of 80,000 feet, the missile no longer serves as a target. However, the forebody section does contain valuable electrical equipment which it is highly desirable to salvage. It has been found that if the parachute carrying this section remains deployed throughout the entire descent from such a high altitude, there is a likelihood that the parachute will be caught in thermal currents which will carry the missile great distances, perhaps several hundred miles, before it comes to earth.

The principal object of the present invention is to provide a parachute control system by means of which a parachute can initially be deployed to lower a missile through a target area and until the missile drops to a predetermined altitude, for example the 80,000 feet corresponding to the lower limit of the target area. Thereafter, the parachute is collapsed so that the missile drops very rapidly with a minimum amount of drift until the missile reaches a lower predetermined altitude close to earth, for example a few hundred to a thousand feet. At this altitude, the parachute is reopened to gently lower the missile to the ground.

More particularly, a parachute constructed in accordance with the present invention includes a canopy having peripherally attached shroud lines secured to a shroud ring. This shroud ring is initially mounted within the missile section by means including an explosive bolt fastener. The shroud ring is also connected to the forebody section by means of a plurality of elongated riser lines. The apex of the canopy is joined to the forebody section by means of a vent or control line. The length of this line is such that when the shroud ring is disposed within the missile section, the parachute can be fully opened with the canopy apex in its normal position. During the initial deployment of the parachute the canopy is fully opened with the shroud ring being held in engagement with the missile section by means of the explosive fastening.

The parachute remains open in this manner as the missile drops through the target range. However, when the missile reaches the preselected lower altitude limit of the target range, a signal is provided either from a ground control station or from a programming unit carried by the missile. This signal actuates the explosive connector. When this connector is actuated, the shroud ring is disengaged from the forebody section so that the forebody section drops away from the shroud ring until the riser lines are pulled taut. The forebody section is then supported below the shroud ring by the riser lines. However, when the forebody drops in this manner, it pulls downwardly upon the vent line or control line. This line in turn pulls the canopy apex downwardly to collapse the parachute causing a rapid descent. The parachute thus drops rapidly toward the ground with only a minimum amount of lateral or drifting movement.

When the parachute reaches a predetermined lower altitude, for example 1,000 feet, the vent line is cut by means of an automatic line cutter actuated by a pressure gage or a ground control signal. When the vent line is thus cut, the apex is freed and rises to its normal position so that the parachute is reopened.

While the parachute has thus far been described as it is used in conjunction with the target missile, it will readily be appreciated that the parachute control apparatus is equally useful in other embodiments as well, for example, in connection with the recovery of research pay loads carried aloft by missile. These research instruments are frequently used to conduct tests at predetermined altitudes. After the research instruments have dropped below that altitude, it is desired to recover the pay load of instruments. In this connection it is desirable to provide a rapid descent to prevent excessive drift. This can be accomplished by supporting the research instruments from a parachute of this invention. When initially deployed the parachute slows the descent of the instruments so long as they are above a predetermined altitude. Thereafter, the parachute can be collapsed to speed descent and minimize drift of the instruments. Then, as in the previously described embodiment, the parachute is reopened at a selected minimum level to slow the descent of the pay load and cushion its landing.

One of the principal advantages of the present parachute apparatus is that it provides simple means for automatically increasing the rate of descent of a parachute after it has reached a certain position, thereby minimizing the drift of a parachute throughout a substantial portion of its descent.

Another advantage of the present invention is that it provides simple means for automatically reopening a parachute at a selected lower level so that the rate of descent of a parachute and its pay load is slowed down to a point where the pay load is not damaged by its impact with the ground.

A still further advantage of the present parachute control apparatus is that it is extremely reliable in operation.

Yet another advantage of the present parachute control apparatus is that it requires very few components, is very lightweight and occupies only a small amount of space.

These and other objects and advantages of the present invention will be more readily apparent from a consideration of the following detailed description of the drawings illustrating a preferred embodiment of the invention.

In the drawings:

FIGURE 9 is a longitudinal cross sectional view of a portion of the aft end of the forebody section.

FIGURE 10 is a cross sectional view taken along line 10—10 of FIGURE 9.

FIGURE 11 is a cross sectional view taken along line 11—11 of FIGURE 9.

FIGURE 12 is a cross sectional view taken along line 12—12 of FIGURE 9.

FIGURE 13 is a cross sectional view taken along line 13—13 of FIGURE 11.

Figure 1:
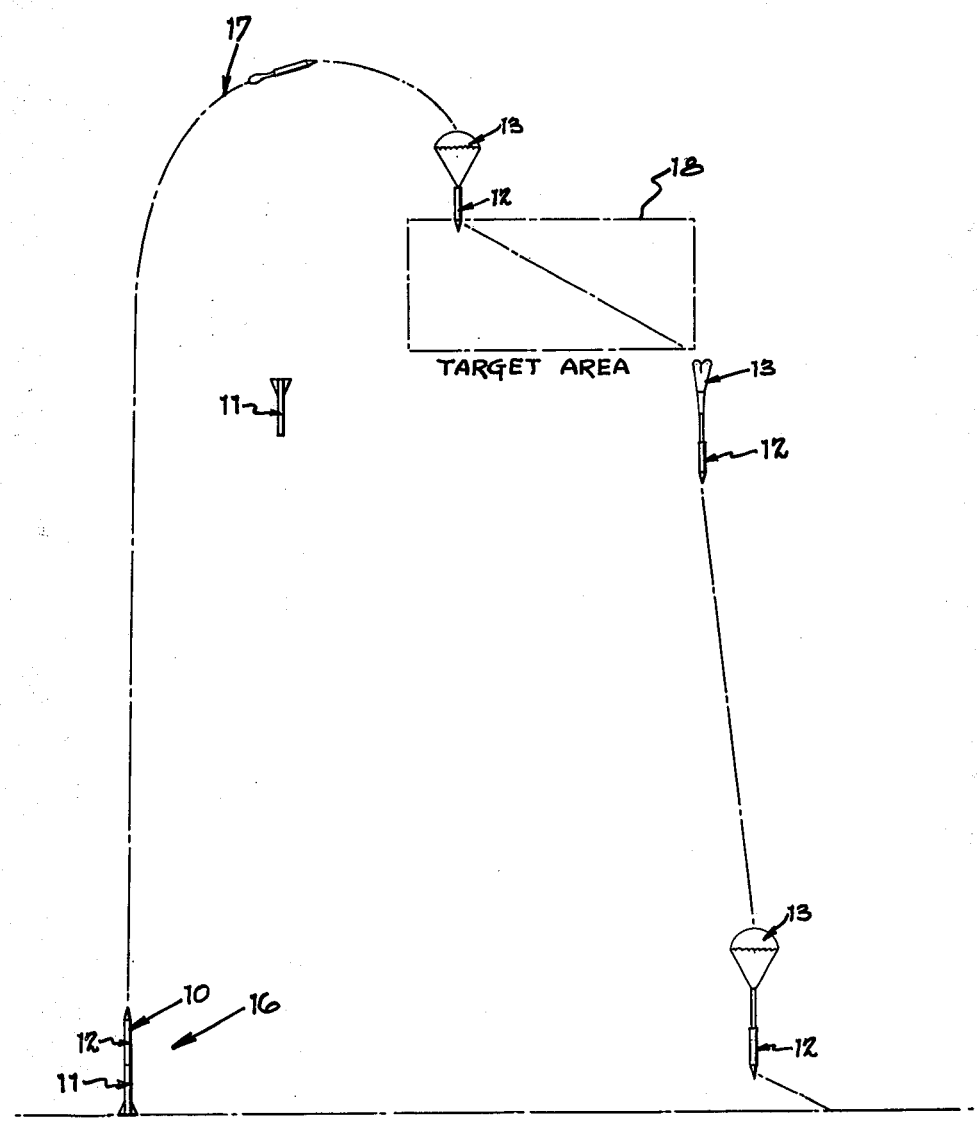
FIGURE 1 is a diagrammatic view showing the flight path of a missile equipped with the parachute reefing and redeployment unit of the present invention.

As is shown in FIGURES 1–8, one missile 10 fitted with the parachute control apparatus of the present invention is a two-section missile comprising an afterbody, or motor section 11, a nose, or forebody section 12. These sections are telescopically joined and are adapted to be separated by means of an explosive charge in a manner well known in the art. The forebody section 12 is adapted to house electronic equipment such as units effective to provide signals for infrared and radar tracking devices. Forebody section 12 also houses a parachute indicated generally at 13. This parachute includes a canopy 14, the apex of which is releasably attached to the afterbody 11 by means of a pull cord 15, the pull cord being adapted to break at a predetermined tension in response to the desired separation between the afterbody and missile section.

It is considered helpful in the understanding of the present parachute device to first consider the manner in which it functions in a typical embodiment. Accordingly, FIGURE 1 illustrates the way in which a missile, such as missile 10, is brought to earth utilizing the parachute control apparatus of this invention. As is there shown, the missile is launched from a ground launching site indicated at 16. In the trajectory shown, the missile is fired in a substantially vertical path and arcs over into generally horizontal flight as it reaches the apex of its path. With the missile in the upper portion of its path as indicated generally at 17, the missile section and motor section are separated by means of an explosive charge triggered in response to a programming device carried by the missile or a ground control signal.

Figure 2:
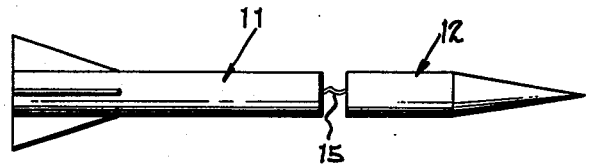
FIGURE 2 is a semi-diagrammatic elevational view of a missile shortly after the afterbody and forebody sections have separated.
Figure 3:
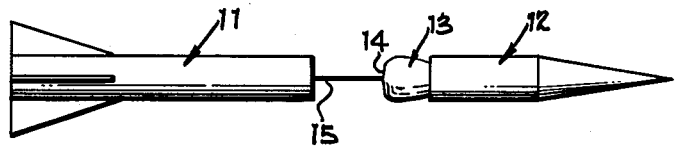
FIGURE 3 is a semi-diagrammatic view similar to FIGURE 2 showing the manner in which the parachute is pulled from the forebody section of the missile.

The general mode of separation is shown in FIGURES 2–5. FIGURE 2 shows the afterbody shortly after a charge has been exploded between that body and the forebody section 12. As these two sections are driven apart, the afterbody pulls cord 15 and parachute 13 from its compartment within forebody section 12.

Figure 4:
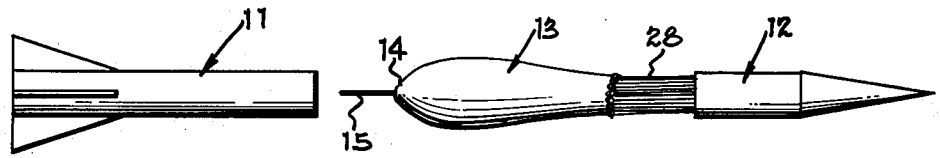
FIGURE 4 is a view similar to FIGURE 3 showing the reefed parachute fully withdrawn from the forebody section with the attachment cord between the parachute and afterbody being severed.

When the afterbody and forebody section have separated a sufficient distance so that parachute canopy 14 is fully extended, as is shown in FIGURE 4, the tension on cord 15 increases to a point where that cord breaks so that the missile section and parachute are completely disengaged from the afterbody 11. Thereafter, as is explained in detail below, parachute reefing lines are cut in response to a signal developed by a programming device carried by the missile or in response to a ground control signal so that the parachute is initially deployed as the missile reaches a preselected altitude corresponding to the upper limit of the target area. The missile then drifts slowly down through the target area indicated at 18. When the missile reaches the lower altitude limit of the target area, a second signal is emitted by the programmer or ground control and is effective to partially collapse the parachute so that the missile drops rapidly until it reaches a selected lower altitude, for example 1,000 feet. At this altitude, in response to another signal from a ground control station, programming device, or the like, the parachute is redeployed to slow the descent of the missile prior to its impact with ground.

More particularly, the details of construction of the parachute unit are best shown in FIGURES 6–13. As is there shown, forebody 12 comprises a generally thin cylindrical body shell formed of a suitable lightweight metal, such as a magnesium thorium alloy. This forebody section is telescopically joined as at 20 to afterbody section 11. A suitable separating unit including a bladder and an explosive charge is mounted at the juncture sections 11 and 12. The details of this portion of the missile are not shown since they are conventional and constitute no part of the present invention.

The nose portion of forebody 12 houses suitable electronic gear which is also of a conventional type and is not shown since it constitutes no part of the present invention. The forebody also carries either an electro-mechanical programmer for providing signals for actuating the parachute control apparatus or a receiver for receiving ground control signals for actuating the parachute control apparatus. Again, the exact details of the receiver or electro-mechanical programmer constitute no part of the present invention, and since the construction of these units is well known in the art, these units are not shown in detail.

Forebody section 12 also carries parachute bag 21. This bag is formed of heavy canvas, leather, or the like, and is of generally circular configuration. The bag has one open end disposed adjacent to the afterbody section and has a transverse bottom wall 19 disposed adjacent to the forward end of the missile. Bottom wall 19 is provided with a plurality of spaced openings formed by eyelets, or the like, adapted to receive riser lines 22, 23, 24 and 25 and control line 26. Parachute 13 includes a canopy 14 folded within bag 21 in a conventional manner. As was explained previously, a line 15 interconnects the apex of the parachute to the afterbody section 11.

The skirt portion of parachute 13 is connected to a plurality of shroud lines 28 in a conventional manner. These shroud lines are in turn joined to a shroud ring 30. Shroud ring 30 is initially disposed within bag 21 and is held in a transverse plane adjacent to the closed end of the bag by means of a retaining ring assembly 31. Retaining ring assembly 31 includes a ring which is secured in any suitable manner to the inner wall of the body of missile section 12 as by means of bolts 29. Ring 31 supports a plurality of retaining blocks 32, 33, 34 and 35. Each of these blocks is mounted upon the retaining ring in any suitable manner, such as by means of rivets 36. The blocks extend inwardly into bag 21 through suitable openings in the bag wall.

Shroud ring 30 carries three radially extending pins 37, 38 and 40 which are positioned to be received within angulated slots 41 formed in blocks 32–34. Each of the slots 41 extends in a direction from the forward to the aft end of missile section 12 and outwardly from the center toward one side wall of the block. It is to be understood that all of the slots are angulated in the same sense so that as the ring 30 is rotated slightly (in a counterclockwise direction in FIGURES 9 and 13) the pins 37, 38 and 40 will become totally disengaged from their cooperative blocks.

In addition to pins 37, 38 and 40, the shroud ring 30 also carries an explosive bolt 42 which extends radially outwardly from the ring. This bolt is surrounded by a sleeve 43 and rotatably engages an opening in block 35. Explosive bolt 42 is of conventional construction and is fitted with electrical leads 44. One suitable bolt is produced by Holex Corporation and is designated P.N. 2504–13. It is to be understood that the bolt contains an explosive charge so that when a potential is applied to leads 44, the charge is ignited causing the bolt to shear at the juncture of sleeve 43 and block 35.

Figure 6:
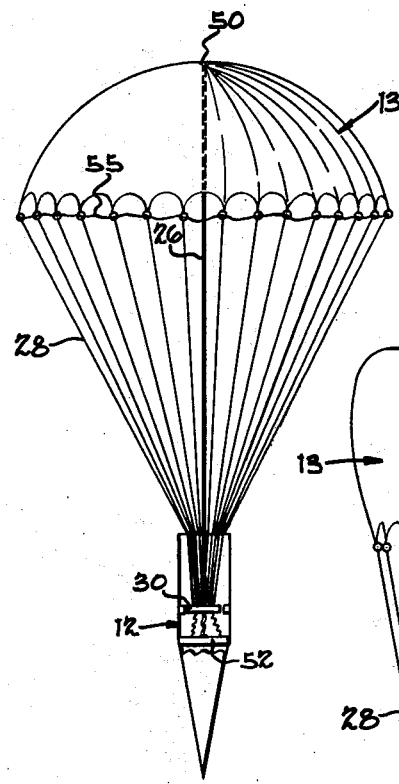
FIGURE 6 is a semi-diagrammatic elevational view of the parachute as it is initially deployed.

Four riser lines 22–25 are connected to retainer ring 30. The opposite end of each of the riser lines is respectively connected to one of the eyebolts or shackles 45, 46, 47 and 48. It is to be understood that the length of these riser lines is substantially equal to the sum of the distance between the shackles and shroud ring 30 when it is supported within missile section 12 and the relative displacement of the apex 50 of parachute canopy 14 and the shroud ring when the parachute is shifted from the initially open position of the parachute as is shown in FIGURE 6 to the collapsed position of the parachute shown in FIGURE 7.

A control line, or vent line 26 is joined to a fifth shackle 51 mounted upon cross brace 52. This control line is connected at its opposite end to apex 50. The length of the control line is such that when shroud ring 30 is mounted within the missile section 12, the canopy can assume its fully opened position shown in FIGURE 6. Control line 26 passes through a line cutter 53. This line cutter is electrically responsive and includes electrical leads 54 which are adapted to be energized either by a programming device or by a receiver of ground control signals. It is to be understood that the cutter includes a blade which is adapted to be driven by an electrically actuated explosive charge across a slotted tubular member, or anvil, which is mounted upon the control line. One preferred form of cutter is a subminiature reefing line cutter produced by Ordance Associates Inc. and which is identified as their model OA–A5. The general construction of a reefing line cutter is shown in Benjamin Patent No. 2,755, 550. It is to be understood, however, that in the present reefing line cutter the explosive charge is actuated electrically rather than mechanically as is shown in the Benjamin patent.

Figure 5:
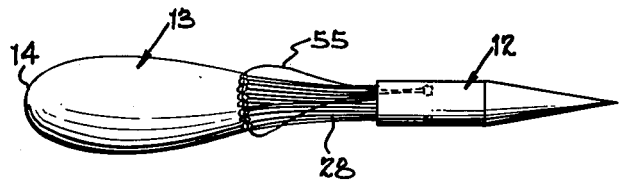
FIGURE 5 is a view similar to FIGURE 4 showing the parachute starting to open following severance of the reefing cords.

In addition to the elements described above, the present parachute assembly also includes reefing lines 55. These reefing lines pass through the rings joining the shroud lines 28 to the skirt portion of canopy 14. The reefing lines also carry electrical reefing line cutters 56 which are identical with cutter 53. The reefing lines function to hold the canopy skirt bunched, i.e., to prevent the canopy from opening when it is initially pulled from the missile section 12 as is shown in FIGURE 5. However, when the cutters 56 sever the reefing lines the parachute is free to expand to its deployed position.

In operation the missile 10 is fired from a launching site, such as launching site 16. During the launching period and the initial flight, parachute 13 is folded within bag 21 and shroud ring 30 is held within retaining ring 31. After the missile reaches a predetermined height, a programming device or a ground control signal responsive device actuates an explosive charge to separate forebody section 12 from afterbody section 11. During this separation, cord 15 which is attached to both the afterbody section 11 and the apex 50 of the parachute canopy is pulled rearwardly.

This cord is effective to pull the parachute from the parachute bag. When the tension on cord 15 exceeds a predetermined amount, the cord breaks as is shown in FIGURE 4. At this point, the parachute is pulled completely free from forebody 12, but is held in a closed position by reefing lines 55. Before the parachute reaches the upper limit of the target area, a signal from a programming device or a ground control signal energizes reefing line cutters 56. These cutters sever the reefing lines whereupon the parachute extends to its open, or deployed position, as shown in FIGURE 6. It is to be noted that in this position the shroud ring 30 is firmly held by its engagement with retaining blocks 32–35. With the parachute open, the missile drifts slowly downwardly through the target area.

When the parachute reaches the lower limit of the target area, a ground control signal, or signal from the programming device, energizes explosive nut 42. This causes the bolt to be severed whereupon the retaining ring rotates slightly in a counterclockwise direction as viewed in FIGURE 7 to disengage pins 37, 38 and 40 from the slots 41 in the adjacent retaining blocks.

Figure 7:
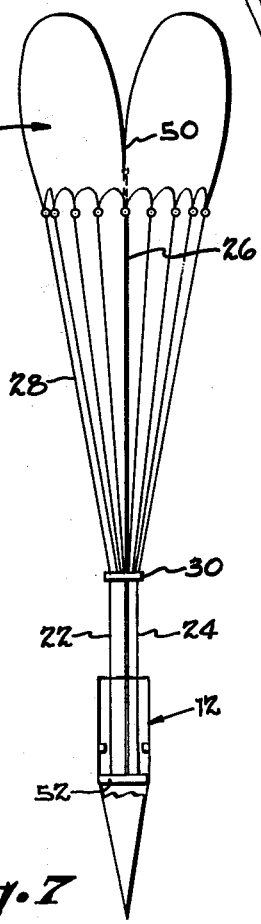
FIGURE 7 is a semi-diagrammatic elevational view showing the parachute collapsed to cause rapid descent of the missile.
Figure 8:
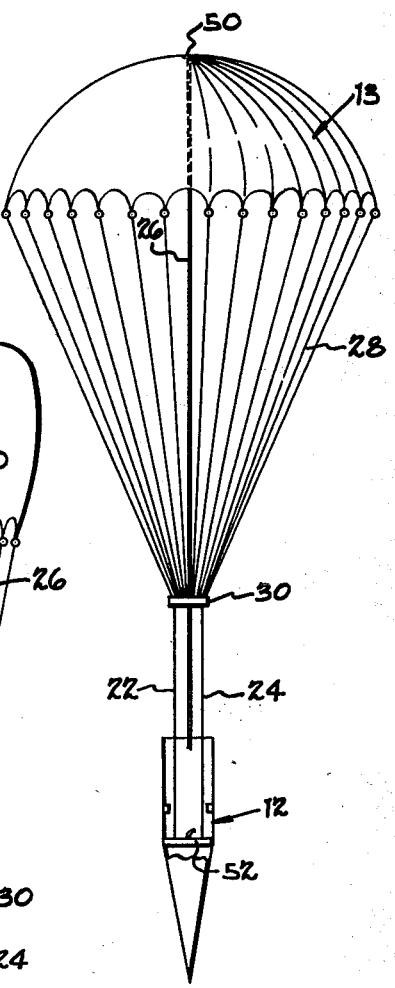
FIGURE 8 is a semi-diagrammatic elevational view showing the parachute after it has been redeployed.

When the pins are freed from the retaining blocks, the forebody section 12 drops away from the parachute and shroud ring 30 as is shown in FIGURE 7. The forebody section 12 is then supported by the riser lines 22–25. When the forebody section 12 drops this distance, it pulls vent line, or control line 26 with it. This causes apex 50 of the canopy to be pulled downwardly in a similar manner so that the chute assumes the collapsed position of FIGURE 7. The chute then descends rapidly in this collapsed position until it reaches a preselected lower altitude, for example several hundred to a thousand feet. At this altitude, an electrical signal is applied from a source, such as a pressure sensitive gage, a ground control station, or the like, to cutter 53 in engagement with control line 26. This cutter thus severs the control line allowing apex 50 to rise to redeploy the parachute as shown in FIGURE 8. The parachute is thus effective to slow the descent of the load prior to the time the load hits the ground.

From the foregoing disclosure of the general principles of the present invention and the above detailed description of a preferred embodiment, those skilled in the art will readily comprehend various modifications to which the invention is susceptible. For example, while the present parachute has been particularly described in connection with the recovery of a target missile, the parachute can be used to advantage with many other devices; for example, a research pay load which it is desirable to maintain aloft at high altitudes, then drop rapidly to minimize sideways drift and finally to decelerate prior to its impact with the ground. Accordingly, I desire to be limited only by the scope of the following claims. Also, in some instances it may be desirable to merely collapse the parachute without redeployment. In such a case, the shroud ring is disengaged from the retaining ring as explained above, but the control line would not be cut. Those skilled in the art will readily understand how the present parachute can be utilized by itself or with other elements to provide still other types of operation.

Having described my invention, I claim:

1. Parachute apparatus comprising a parachute having a canopy, a plurality of shroud lines, a shroud ring, each of the shroud lines being interconnected to the canopy and to the shroud ring, a plurality of riser lines interconnecting said shroud ring to a load, a control line, means interconnecting one end of said control line to the load, the other end of said control line being attached to the apex of said canopy, and means including an explosive bolt releasably securing said shroud ring in close proximity to said load, whereby when said shroud ring is released from said load, said load is supported from said shroud ring by means of said riser lines and is disposed a substantial distance below said shroud ring, said control line pulling said apex downwardly to collapse said parachute, and an electrically actuated line cutter in engagement with said control line to effect redeployment of said parachute.

2. Parachute apparatus, said parachute apparatus comprising a parachute compartment, a parachute having a canopy, a plurality of shroud lines, a shroud ring, each of said shroud lines having one end thereof secured to the shroud ring and the opposite end thereof secured to said canopy, said shroud ring carrying a plurality of outwardly extending members, means carried by said load for receiving said members, at least one of said outwardly extending members being an explosive bolt, the others of said outwardly extending members becoming disengaged from the cooperating receiving means carried by said load when said explosive bolt is exploded, said canopy and said shroud lines also being disposed within said compartment, a control line secured to the apex of said canopy, means securing the other end of said control line to said load, a plurality of riser lines, means securing said riser lines to said load and to said shroud ring, said load being supported by said riser lines a substantial distance below said ring when said ring is disengaged from said load, a cutter associated with said control line for severing said line.

3. Parachute apparatus, said parachute apparatus comprising a parachute compartment, a parachute having a canopy, a plurality of shroud lines, a shroud ring, each of said shroud lines having one end thereof secured to the shroud ring and the opposite end thereof secured to said canopy, said shroud ring carrying a plurality of outwardly extending pins and an explosive bolt, a plurality of blocks carried by said load, said blocks having slots formed therein for receiving said pins, one of said blocks threadably receiving said bolt, said pins becoming disengaged from the slots in said blocks when said explosive bolt is exploded, said canopy and said shroud lines also being disposed within said compartment, a control line secured to the apex of said canopy, means securing the other end of said control line to said load, a plurality of riser lines, means securing said riser lines to said load and to said shroud ring, said load being supported by said riser lines a substantial distance below said ring when said ring is disengaged from said load, and a cutter associated with said control line for severing said line.

4. Parachute apparatus, said parachute apparatus comprising a parachute compartment, a parachute having a canopy, a plurality of shroud lines, a shroud ring, each of said shroud lines having one end thereof secured to the shroud ring and the opposite end thereof secured to said canopy, said shroud ring carrying a plurality of outwardly extending pins, and an explosive bolt, a plurality of blocks carried by said load, said blocks having slots formed therein for receiving said pins, said slots extending angularly relative to the axis of said compartment and extending from the central portion of said blocks to an edge thereof, one of said blocks threadably receiving said bolt, said pins becoming disengaged from the slots in said blocks when said explosive bolt is exploded, said canopy and said shroud lines also being disposed within said compartment, a control line secured to the apex of said canopy, means securing the other end of said control line to said load, a plurality of riser lines, means securing said riser lines to said load and to said shroud ring, said load being supported by said riser lines a substantial distance below said ring when said ring is disengaged from said load, and a cutter associated with said control line for severing said line.

5. Parachute apparatus, said parachute apparatus comprising a parachute compartment, a parachute having a canopy, a plurality of shroud lines, a shroud ring, each of said shroud lines having one end thereof secured to the shroud ring and the opposite end thereof secured to said canopy, said shroud ring carrying a plurality of outwardly extending members, cooperating means carried by said load for receiving said members, at least one of said members being an explosive bolt, the others of said extending members becoming disengaged from the cooperating means carried by said load when said explosive bolt is exploded, said canopy and said shroud lines also being disposed within said compartment, a control line secured to the apex of said canopy, means securing the other end of said control line to said load, a plurality of riser lines, means securing said riser lines to said load and to said shroud ring, said load being supported by said riser lines a substantial distance below said ring when said ring is disengaged from said load, said control line being dimensioned so that such apex is fully extended and said parachute is deployed when said shroud ring engages said cooperating means in said load, and said apex is forced downwardly and said apex is collapsed when said shroud ring is disengaged from said cooperating means.

6. Parachute apparatus, said parachute apparatus comprising a parachute compartment, a parachute having a canopy, a plurality of shroud lines, a shroud ring, each of said shroud lines having one end thereof secured to the shroud ring and the opposite end thereof secured to said canopy, said shroud ring carrying a plurality of outwardly extending members, cooperating means carried by said load for receiving said members, at least one of said members being an explosive bolt, the others of said extending members becoming disengaged from the cooperating means carried by said load when said explosive bolt is exploded, said canopy and said shroud lines also being disposed within said compartment, a control line secured to the apex of said canopy, means securing the other end of said control line to said load, a plurality of riser lines, means securing said riser lines to said load and to said shroud ring, said load being supported by said riser lines a substantial distance below said ring when said ring is disengaged from said load, said riser lines being of a length greater than the distance which the apex of the canopy must be pulled downwardly to collapse the parachute, a cutter associated with said control line for severing said line.

References Cited in the file of this patent
UNITED STATES PATENTS

| 2,489,984 | Shoemaker | Nov. 29, 1949 |
| 2,798,683 | Swenson | July 9, 1957 |
| 2,973,928 | Turolla | Mar. 7, 1961 |
| 3,009,673 | Knacke | Nov. 21, 1961 |
| 3,015,463 | Gross | Jan. 2, 1962 |
| 3,049,322 | Vlasic | Aug. 14, 1962 |